United States Patent
Raghavan et al.

(10) Patent No.: US 11,950,106 B2
(45) Date of Patent: Apr. 2, 2024

(54) USER EQUIPMENT CAPABILITY INDICATION OF RECEIVE BEAMFORMING FOR CELL IDENTIFICATION

(71) Applicant: Apple Inc., Cupertino, CA (US)

(72) Inventors: Manasa Raghavan, Sunnyvale, CA (US); Jie Cui, San Jose, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 17/267,080

(22) PCT Filed: Aug. 9, 2019

(86) PCT No.: PCT/US2019/046046
§ 371 (c)(1),
(2) Date: Feb. 9, 2021

(87) PCT Pub. No.: WO2020/033914
PCT Pub. Date: Feb. 13, 2020

(65) Prior Publication Data
US 2021/0314785 A1 Oct. 7, 2021

Related U.S. Application Data

(60) Provisional application No. 62/716,697, filed on Aug. 9, 2018.

(51) Int. Cl.
*H04W 4/00* (2018.01)
*H04B 7/06* (2006.01)
(Continued)

(52) U.S. Cl.
CPC .......... *H04W 16/28* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS

| 2010/0296410 A1 | 11/2010 | Kazmi et al. |
| 2013/0242796 A1 | 9/2013 | Chen et al. |

(Continued)

FOREIGN PATENT DOCUMENTS

| CN | 101971662 A | 2/2011 |
| CN | 102595475 A | 7/2012 |

(Continued)

OTHER PUBLICATIONS

"Extended European Search Report for European Patent Application No. 19846268.1", dated Mar. 16, 2022, 13 Pages.

(Continued)

*Primary Examiner* — Bob A Phunkulh
(74) *Attorney, Agent, or Firm* — Eschweiler & Potashnik, LLC

(57) ABSTRACT

An apparatus of a New Radio (NR) User Equipment (UE), a method, and a system. The apparatus includes a Radio Frequency (RF) interface, and processing circuitry coupled to the RF interface. The processing circuitry is to: generate a signal including capability information of the UE, wherein a time period for intra-frequency cell detection and measurement for the UE is based on the capability information; and cause a transmission of the signal within a cellular network to include the UE using the RF interface.

18 Claims, 6 Drawing Sheets

(51) Int. Cl.
  *H04W 8/24*   (2009.01)
  *H04W 16/28*  (2009.01)
  *H04W 56/00*  (2009.01)
  *H04W 76/11*  (2018.01)

(52) U.S. Cl.
  CPC .......... *H04W 8/24* (2013.01); *H04W 56/001* (2013.01); *H04W 76/11* (2018.02)

(56) References Cited

U.S. PATENT DOCUMENTS

| | | | |
|---|---|---|---|
| 2013/0258875 A1 | 10/2013 | Siomina et al. | |
| 2015/0092738 A1 | 4/2015 | Chakraborty et al. | |
| 2017/0064578 A1 | 3/2017 | Takahashi et al. | |
| 2018/0034598 A1 | 2/2018 | Yiu et al. | |
| 2018/0041936 A1 | 2/2018 | Kim et al. | |
| 2018/0184319 A1 | 6/2018 | Fong et al. | |
| 2018/0199343 A1* | 7/2018 | Deogun | H04L 5/0044 |
| 2019/0028943 A1* | 1/2019 | Wang | H04W 8/065 |
| 2019/0159140 A1* | 5/2019 | Wang | H04L 5/0082 |
| 2020/0008143 A1* | 1/2020 | Jain | H04W 72/0453 |
| 2020/0037212 A1* | 1/2020 | Ramachandra | H04W 36/0088 |
| 2020/0112355 A1* | 4/2020 | Park | H04B 7/0626 |
| 2020/0213066 A1* | 7/2020 | Ma | H04W 24/02 |
| 2021/0084511 A1* | 3/2021 | Harada | H04W 24/10 |
| 2021/0194563 A1* | 6/2021 | Zhang | H04W 24/10 |

FOREIGN PATENT DOCUMENTS

| | | |
|---|---|---|
| CN | 103609179 A | 2/2014 |
| CN | 105580458 A | 5/2016 |
| CN | 107113638 A | 8/2017 |
| CN | 107637120 A | 1/2018 |
| WO | 2017118898 A1 | 7/2017 |
| WO | 2017203487 A1 | 11/2017 |

OTHER PUBLICATIONS

"3rd Generation Partnership Project; Technical Specification Group Radio Access Network; NR; Requirements for support of radio resource management", In 3GPP TS 38.133, Jun. 2018, 79 Pages.

"Discussion on RRM core requirements with Rx beamforming in FR2", In 3GPP TSG-RAN WG4 Meeting #87, May 21-25, 2018, 2 Pages.

International Search Report dated Dec. 30, 2019 for International Application No. PCT/US2019/046046.

"Measurement requirements for deactivated SCells in FR2." Source: Ericsson. Agenda Item: 5.2.4.1. 3GPP TSG-RAN WG4 Meeting #AH1807, Montreal, Canada, Jul. 2-6, 2018. R4-1808709.

"Further discussion on the requirements in NR RRC-Idle." Source: Intel Corporation. Agenda Item: 5.2.5. 3GPP TSG-RAN WG4 Meeting AH-1807 LTE/NR perf, Montreal, Canada, Jul. 2-6, 2018. R4-1808753.

3rd Generation Partnership Project; Technical Specification Group Radio Access Network; NR; Requirements for support of radio resource management (Release 15). 3GPP TS 38.133 V15.2.0 (Jun. 2018).

3GPP TSG-RAN WG4 Meeting #87 "Discussion on RRM core requirements with Rx beamforming in FR2" Published on May 21, 2018.

3GPP TSG-RAN WG4 Meeting #85. "RAN4#84Bis Meeting report" Published on Nov. 27, 2017.

Tang, Jianbin. "Research on Wireless Resource Management Technology for Small Cell in LTE-Advanced" Published on Nov. 20, 2014.

3GPP TSG RAN meeting #78. "Status Report to TSG" Published on Dec. 18, 2017.

Jia et al. "Towards Studying the Two-Tier Intra-Frequency X2 Handover Based on Software-Defined Open LTE Platform" IEEE Access, vol. 6. Published on Jul. 10, 2018.

* cited by examiner

USER EQUIPMENT CAPABILITY INDICATION OF RECEIVE BEAMFORMING FOR CELL IDENTIFICATION

CROSS REFERENCE TO RELATED APPLICATION

This application is a National Phase entry application of International Patent Application No. PCT/US2019/046046 filed Aug. 9, 2019, which claims priority to U.S. Provisional Patent Application 62/716,697 entitled "UE CAPABILITY INDICATION OF RX BEAMFORMING FOR CELL IDENTIFICATION") filed Aug. 9, 2018, and is hereby incorporated by reference in its entirety.

FIELD

Various embodiments generally may relate to the field of wireless communications.

BACKGROUND

In 5G/NR the intra-frequency cell identification delay requirements measurements correspond to $T_{PSS/SSS\_sync}$ (time period used in Primary Synchronization Signal (PSS) or Secondary Synchronization Signal (SSS) detection), $T_{SSB\_time\_index}$ (time period used to acquire the index of the SSB being measured), $T_{SSB\_measurement\_period}$ (measurement period of SSB based measurement) as defined in the Third Generation Partnership Project's (3GPP's) Technical Specification 38.133. The intra-frequency cell identification delay requirements measurements depend among other things on the configuration of each particular user equipment (UE).

For example, the number of receive (Rx) beams used by any given user equipment (UE) is implementation-specific. To have a single number for the Rx beams to define beamforming requirements to allow intra-frequency cell identification delay requirements measurements is limiting, as different UE types could have different numbers of antenna elements and different number of Rx beams.

Mechanisms are needed to allow intra-frequency cell identification delay requirements measurements given their dependency on UE configurations.

DETAILED DESCRIPTION

Figure 1:
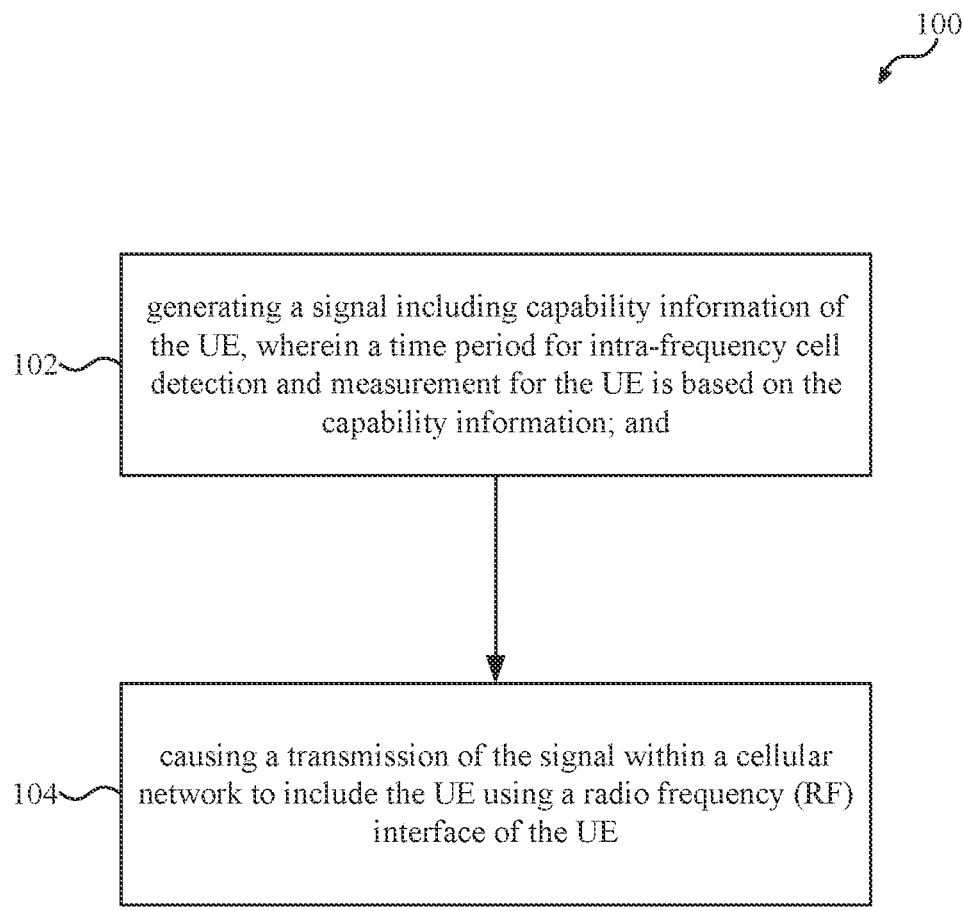
FIG. 1 illustrates a process to be performed at a New Radio (NR) User Equipment (UE) according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In 5G/NR the intra-frequency cell identification delay requirements measurements are comprised of TPSS/SSS_sync (time period used in Primary Synchronization Signal (PSS) or Secondary Synchronization Signal (SSS) detection), TSSB_time_index (time period used to acquire the index of the SSB being measured), T SSB_measurement_period (measurement period of SSB based measurement). Intra-frequency cells may include neighbor cells on the same frequency as the serving cell, but with a different primary scrambling code. The intra-frequency cell info list sent in SIB11 may include up to 8 cells, indexed from 0 to 7. SIB11 refers to the system information block type 11 in NR which contains measurement control information to be used in a cell.

It is noted that frequency range in which 5G NR operates are categories into following two designations: (1) FR1 corresponding to a frequency range from 450 to 6000 MHz; and (2) FR2 corresponding to a frequency range is from 24250 to 52600 MHz. In addition, "SSB" as used herein refers to "Secondary Synchronization Block," "RRM" refers to "Radio Resource Management," "SS" refers to "Synchronization Signal," "Rx" refers to "Receive," and "SMTC" refers to "SS/PBCH Block Measurement Time Configuration," where PBCH refers to "Physical Broadcast Channel."

The intra-frequency cell identification delay requirements were defined in the Third Generation Partnership Project (3GPP) Technical Specification (TS) 38.133 version 15.2.0 (TS 38.133 v15.2.0) as follows:

"The UE shall be able to identify a new detectable intra frequency cell within $T_{identify\_intra\_without\_index}$ if UE is not indicated to report SSB based RRM measurement result with the associated SSB index, or the UE has been indicated that the neighbour cell is synchronous with the serving cell. Otherwise UE shall be able to identify a new detectable intra frequency cell within $T_{identify\_intra\_with\_index}$ The UE shall be able to identify a new detectable intra frequency SS block of an already detected cell within $T_{identify\_intra\_without\_index}$.

$$T_{identify\_intra\_without\_index} = K_{ca}(T_{PSS/SSS\_sync} + T_{SSB\_measurement\_period}) \text{ ms}$$

$$T_{identify\_intra\_with\_index} = K_{ca}(T_{PSS/SSS\_sync} + T_{SSB\_measurement\_period} + T_{SSB\_time\_index}) \text{ ms}$$

Where:

$T_{PSS/TSS\_sync}$: it is the time period used in PSS/SSS detection given in table 9.2.5.1-1, 9.2.5.1-2, 9.2.5.1-5 (deactivated Scell) or 9.2.5.1-6 (deactivated SCell)

$T_{SSB\_time\_index}$: it is the time period used to acquire the index of the SSB being measured given in table 9.2.5.1-3 or 9.2.5.1-4 or 9.2.5.1-7 (deactivated SCell) or 9.2.5.1-8 (deactivated SCell)

$T_{SSB\_measurement\_period}$: equal to a measurement period of SSB based measurement given in table 9.2.5.2-1, table 9.2.5.2-2 table 9.2.5.2-3 (deactivated Scell) or 9.2.5.2-4 (deactivated SCell)."

In the above equations, $K_{ca}$ is defined or FR1, as $K_{ca}=1$ for measurements on frequencies corresponding to PCell or PSCell, and $K_{ca}$ is defined as $K_{ca}$=number of configured SCells for measurements on frequencies corresponding to FR1 only SCells.

The time period for detection and measurement, that is, the $T_{PSS/SSS\_sync}$, $T_{SSB\_measurement\_period}$, and $T_{SSB\_time\_index}$ values may be defined in certain instances based on a generic formula corresponding to FR1 without measurement gaps by a maximum value as between a lower bound value, and a value based on a number of samples times a SS/PBCH Block Measurement Time Configuration (SMTC_period), where "PBCH" stands for "Physical Broadcast Channel." The $T_{PSS/SSS\_sync}$, $T_{SSB\_measurement\_period}$, and $T_{SSB\_time\_index}$ values may be based on:

$$\max(\text{lower\_bound}, \text{number\_of\_samples} \times \text{SMTC\_period}) \quad \text{(Eq. 1)}$$

The lower bound and number of samples are based on a tradeoff between the mobility of the UE in question, that is, the UE mobility and power consumption by the UE, which tradeoff may be found through simulation and numerical analysis for the required cell acquisition or measurement.

In FR2 the UE needs to perform Rx beam sweeping in order to identify the cell. The time period for detection and measurement, that is, the $T_{PSS/SSS\_sync}$, $T_{SSB\_measurement\_period}$, and $T_{SSB\_time\_index}$ values may be defined in certain instances based on a generic formula corresponding to FR2 without measurement gaps by a maximum value as between a lower bound value, and scale factor times a value based on a number of samples times a SMTC_period. One or more of the $T_{PSS/SSS\_sync}$, $T_{SSB\_measurement\_period}$m and $R_{SSB\_time\_index}$ values may be based on:

$$\max(\text{lower\_bound}, N \times \text{number\_of\_samples} \times \text{SMTC\_period}) \quad \text{(Eq. 2)}$$

where N is a scale factor to account for Rx beam sweeping.

From measurement perspective, a FR2 UE will utilize the analog and/or digital receiver beamforming for the measurement. Hence, longer measurement time is needed for FR2 to allow for the FR2 UE to sweep the whole space. An FR2 UE is required to decode PBCH payload during intra-frequency measurement and thus the longer time is needed for intra-frequency measurement. Hence, the measurement requirements are specified for FR1 and FR2 separately.

The gNodeB with which the UE is to communicate, or more network elements of a core network within a network that includes the cells, may determine values for $T_{PSS/SSS\_sync}$, $T_{SSB\_measurement\_period}$, and $T_{SSB\_time\_index}$ in order for the network to have knowledge regarding intra-frequency cell identification delays for UEs within the network. However, by way of example, the number of samples and the scale factor N in Equation 1 depends on the UE. Again, by way of example, to have a single scale factor to allow intra-frequency cell identification delay requirements measurements would be limiting, as different UE types could have different numbers of antenna elements and different number of Rx beams. In addition, having a large value for N could impact mobility requirements (if the UE moves, the given larger N may no longer be applicable), whereas having a small value for N to account for RX beam sweeping would fail to accommodate all types of UEs, which may provide larger beam sweeping capabilities than for example their mobile counterparts.

According to one embodiment, as shown by way of example in FIG. 1, a process 100 may include, at operation 102, generating a signal including capability information of the UE, wherein a time period for intra-frequency cell detection and measurement for the UE is based on the capability information. Process 100 may further include, at operation 104, causing a transmission of the signal within a cellular network to include the UE using a radio frequency (RF) interface of the UE.

Figure 2A:
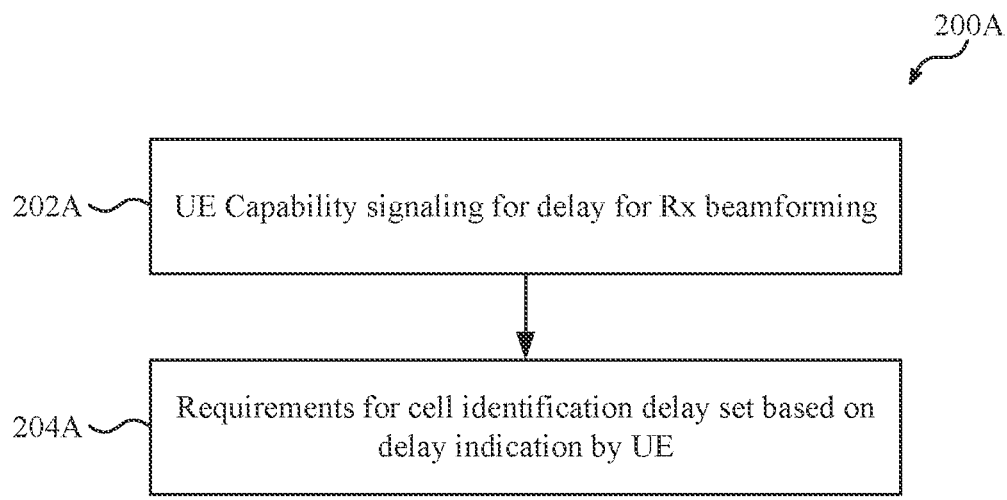
FIGS. 2A-2C illustrate respective processes to be performed at a NR UE according to respective embodiments.

Referring now to FIG. 2A, according an embodiment as shown in process 200A, a UE may be configured to indicate at operation 202A, its capability, such as signaling delay for Rx beam forming. At operation 204A, the gNodeB (or potentially the core network) is to adjust the timers and delay requirements in the context of intra-frequency cell identification delay requirements measurements based on the capability indication by the UE.

The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, VNF, NFVI, and/or the like.

According to yet another embodiment, a UE may be configured to indicate its "type," in terms of whether the type is "stationary," "low mobility," or "high mobility."

Figure 2B:
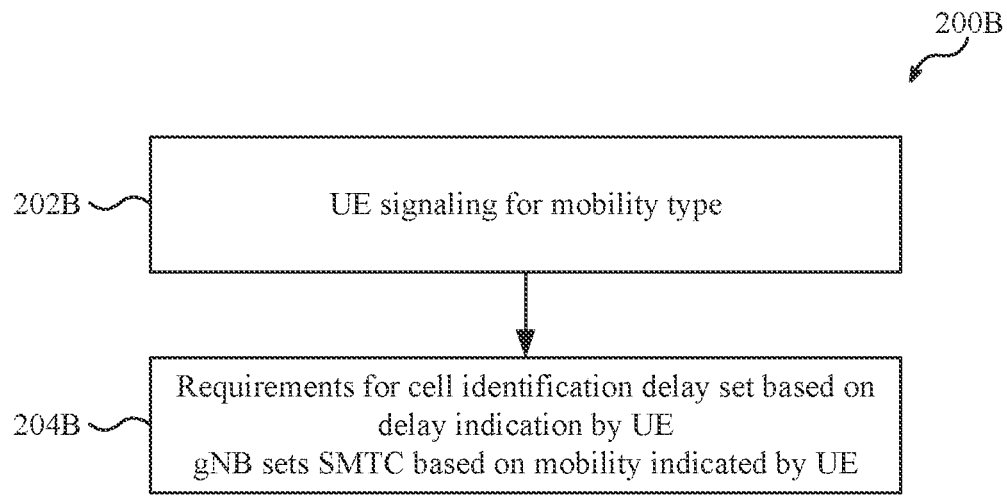

According to an embodiment, as shown by way of example by the process 200B in FIG. 2B, the UE may indicate, at operation 202B, its mobility type as its capability, that is, whether it is "stationary," has "low mobility," or "high mobility." Whether a device's mobility can be characterized as "stationary," "low" or "high" may be predefined for the UE and/or based on UE application needs. A stationary or low mobility UE could have a large number of beams and take longer time for cell identification without impacting mobility performance, whereas a high mobility UE could take shorter time for Rx beam sweeping and cell identification. The delay requirements would be set at operation 204B by a gNode B or core network according to the mobility type declared by the UE, and the gNodeB or core network could also set the SMTC periodicity for the cells to be measured based on the UE mobility. For example, gNodeB or core network could set a lower periodicity for high mobility UEs, and higher periodicity for low mobility or stationary UEs.

Figure 2C:
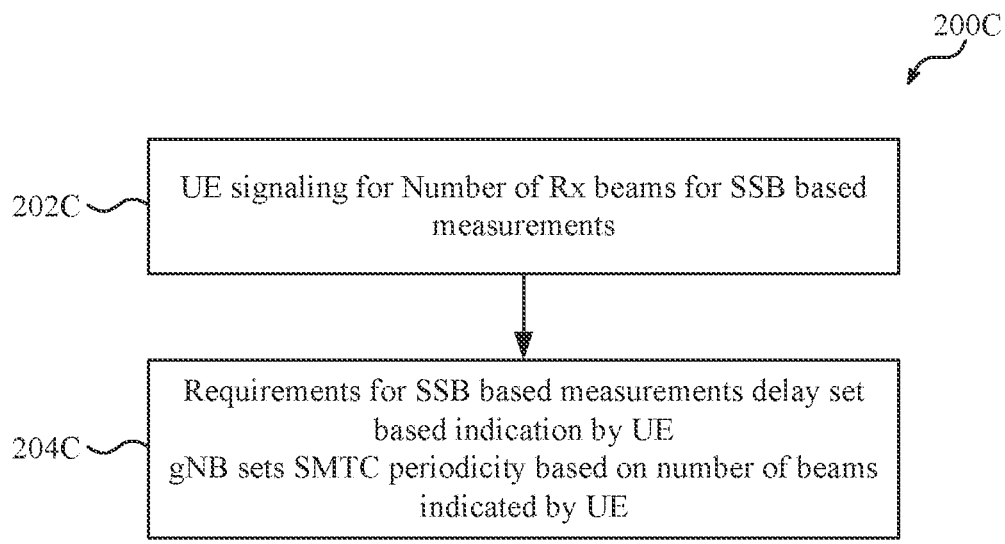

According to one embodiment, as shown by process 200C of FIG. 2C, the UE may at operation 202C indicate its capability in terms of the number of beams required for SSB-based measurements, such as cell identification, radio link monitoring, and beam failure detection.

At operation 204C, the gNodeB or core network may set the requirements for the SSB-based measurements delay based on the indicated capability, and may further set the SMTC periodicity based on the number of beam required for the SSB-based measurements.

According to one embodiment, the UE may signal the number of beams it uses for Rx beam sweeping for cell identification purposes. This number could be used as the scale factor N in the requirements noted above. A UE capability indication for the maximum number of Rx beams used for CSI-RS, maxNumberRxBeam, at the Radio Frequency (RF) layer may, according to one embodiment, be used for the latter purpose.

According to a one embodiment, a UE may be configured to indicate its capability in terms of time needed for cell identification. For example, the UE may indicate its capability in terms of whether the time needed for cell identification is "long," "medium," or "short."

Figure 3:
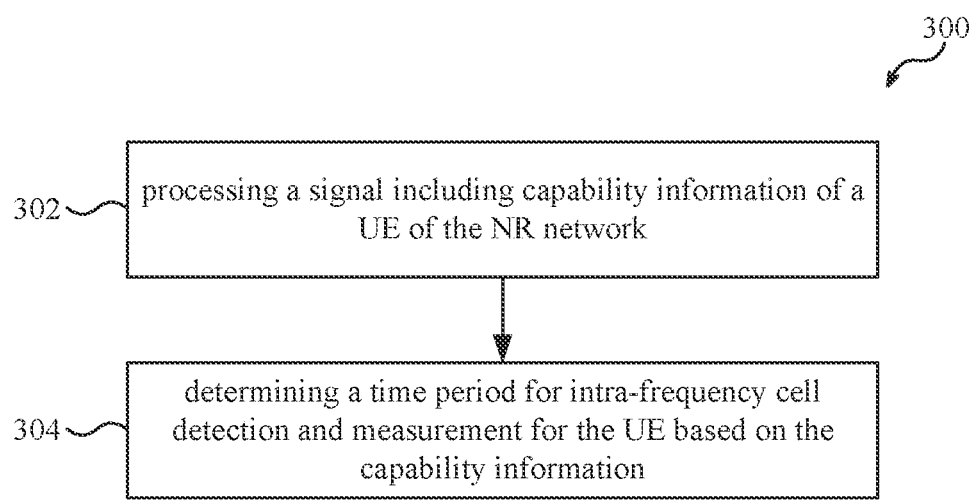
FIG. 3 illustrates a process to be performed at a NR evolved Node B (gNodeB) according to some embodiments.

Referring now to FIG. 3, a process 300 to be performed at a New Radio (NR) evolved Node B (gNodeB) incudes, at operation 302, processing a signal including capability information of a UE of the NR network, and, at operation 304, determining a time period for intra-frequency cell detection and measurement for the UE based on the capability information.

As noted above, because of differing UE implementations, including different UE types, UE power requirements, UE mobilities, etc., for example in the case of FR2, the number of Rx beams and the delay requirements could be different as between the UEs. According to some embodiments, when the UE can signal its capabilities, gNodeB or core network could use this capability to determine or adjust delay requirement for a given UE.

The requirements for PSS/SSS detection, SSB index acquisition and measurement in FR2 are defined as the following in TS 38.133 v.15.2.0:

TABLE 9.2.5.1-2

Time period for PSS/SSS detection, (Frequency range FR2)

| DRX cycle | $T_{PSS/SSS\_sync}$ |
|---|---|
| No DRX | max[ 600 ms, ceil( [5] × $K_p$) × $N_1$ × SMTC period]$^{Note\ 1}$ |
| DRX cycle ≤320 ms | max[ 600 ms, ceil(1.5 × [5] × $K_p$) × $N_1$ × max(SMTC period, DRX cycle) ] |
| DRX cycle >320 ms | Ceil( [5] × $K_p$) × $N_1$ × DRX cycle |
| ... | ... |

NOTE 1:
If different SMTC periodicities are configured for different cells, the SMTC period in the requirement is the one used by the cell being identified

TABLE 9.2.5.1-4

Time period for time index detection (Frequency range FR2)

| DRX cycle | $T_{SSB\_time\_index}$ |
|---|---|
| No DRX | max[ 200 ms, ceil( [5] × $K_p$) × $N_2$ × SMTC period ]$^{Note\ 1}$ |
| DRX cycle ≤320 ms | max[ 200 ms, ceil (1.5 × [5] × $K_p$) × $N_2$ × max(SMTC period, DRX cycle) ] |
| DRX cycle >320 ms | Ceil( [5] × $K_p$) × $N_2$ × DRX cycle |
| ... | ... |

NOTE 1:
If different SMTC periodicities are configured for different cells, the SMTC period in the requirement is the one used by the cell being identified

TABLE 9.2.5.2-2

Measurement period for intra-frequency measurements without gaps(Frequency FR2)

| DRX cycle | $T_{SSB\_measurement\_period}$ |
|---|---|
| No DRX | max[ 400 ms, ceil( 5 × $K_p$) × $N_3$ × SMTC period]$^{Note\ 1}$ |
| DRX cycle ≤320 ms | max[ 400 ms, ceil(1.5 × 5 × $K_p$) × $N_3$ × max(SMTC period, DRX cycle) ] |
| DRX cycle >320 ms | ceil(5 × $K_p$ ) × $N_3$ × DRX cycle |

NOTE 1:
If different SMTC periodicities are configured for different cells, the SMTC period in the requirement is the one used by the cell being identified "DRX" refers to Discontinuous Reception, and is a technique that allows the mobile station to power down significant amounts of its internal circuitry for a high percentage of the time when it is in the idle mode. The period of time when the mobile station will be powered down is commonly called the "Sleep mode"

When intra-frequency SMTC is fully non overlapping with measurement gaps, $K_p$=1

When intra-frequency is partially overlapping with measurement gaps, $K_p$=1/(1−(SMTC period/MGRP)), where SMTC period<MGRP. "MGRP" refers to Measurement Gap Repetition Period.

In FR2 in order to detect multiple intra-frequency cells, the UE needs to perform Rx beam sweeping. The number of Rx beams used by the UE depends on a number of factors, including: (1) the UE type, for example, whether the UE is a handheld UE or a vs Customer Premise Equipment (CPE) UE; handheld UEs have more mobility than CPE UEs, and typically a larger number of antenna elements; (2) the number of antenna panels and antenna elements per panel for a given UE; and (3) other implementation-based features of the UE.

In some embodiments, UE capability signaling may be defined in order for network elements of the core network or a gNodeB (or gNB) to determine the time and delay requirements based on the UE capability signaling.

The UE capability signaling may be implemented according to various embodiments and the delay requirements modified accordingly on gNodeB or core network side.

Some embodiments may utilize one or both of two sets of requirements for UE requiring small delay vs long delay for Rx beam sweeping. With this the UE capability signaling shall declare short vs long delay for Rx beam sweeping and cell identification. The UE capability signaling would be based on the UE implementation and the requirements would be appropriate for the same.

According to one embodiment, a time period for detection and measurement, that is, the $T_{PSS/SSS\_sync}$, $T_{SSB\_measurement\_period}$, and $T_{SSB\_time\_index}$ values may be defined in certain instances based on a generic formula by a maximum value as between a lower bound value, and scale factor times a value based on a number of samples times a SMTC_period, where the scale factor has one value, $N_{short}$, when the UE has indicated that its beam sweeping delay is short, and another value, $N_{long}$, when the UE has indicated that its beam sweeping delay is long. Whether a beam sweeping delay is "short" or "long" may be defined predefined for the UE and/or based on UE application needs. One or more of the $T_{PSS/SSS\_sync}$, $T_{SSB\_measurement\_period}$ and $T_{SSB\_time\_index}$ values may therefore be based on:

$$\max(lower\_bound, N_{short} \times number\_of\_samples \times SMTC\_period) \quad \text{Eq. (3)}$$

$$\max(lower\_bound, N_{long} \times number\_of\_samples \times SMTC\_period) \quad \text{Eq. (4)}$$

where $N_{short}$ is a scale factor to account for Rx beam sweeping corresponding to a UE with a short beam sweeping delay, and $N_{long}$ is a scale factor to account for Rx beam sweeping corresponding to a UE with a long beam sweeping delay.

Some embodiments may include a combination of two or more of the embodiments noted herein. Based on signaling from the UE as described above, a gNodeB or core network may determine delay requirements and associated timers for each UE accordingly.

Figure 4:
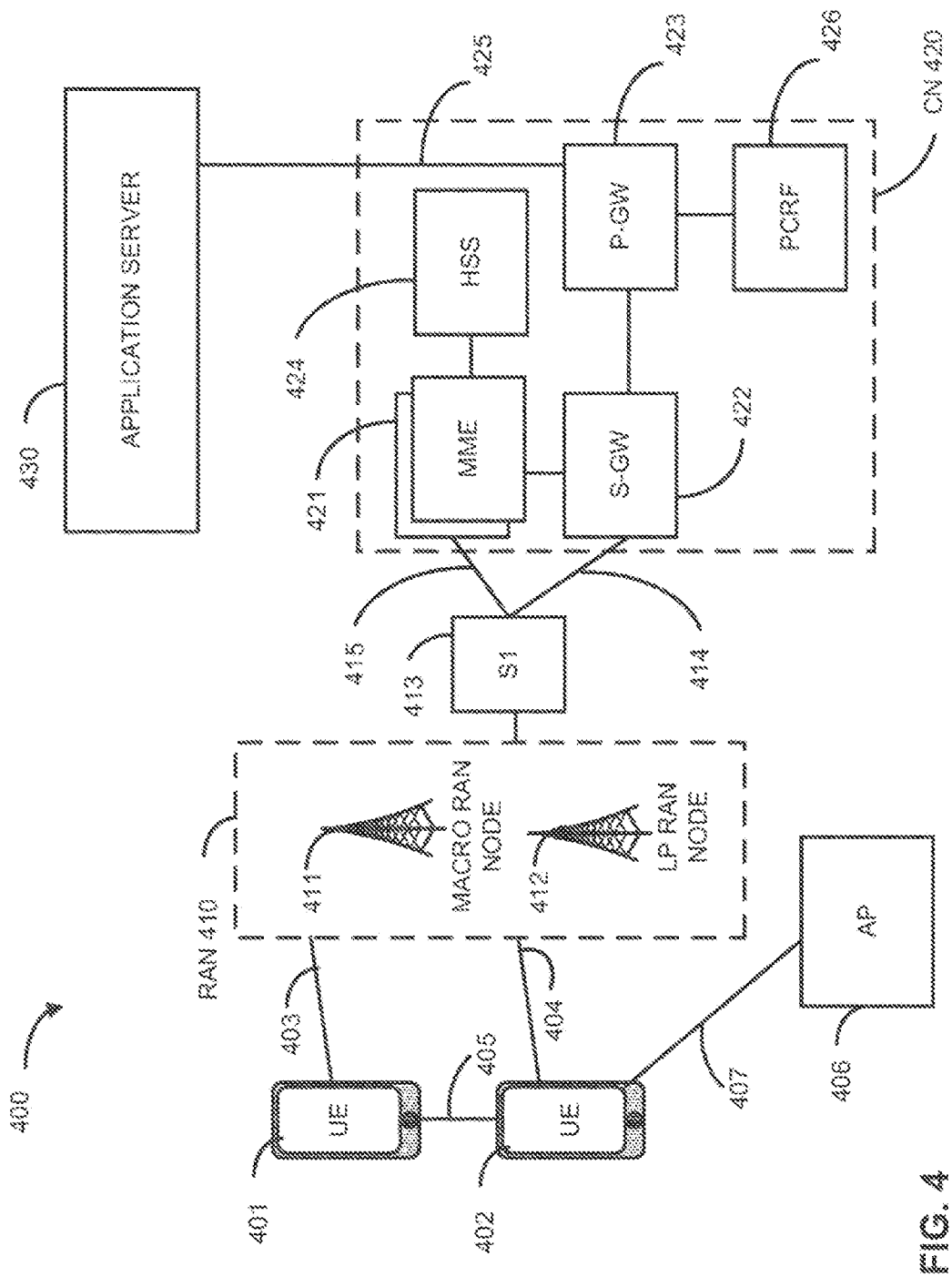
FIG. 4 illustrates an architecture of a system 400 of a network according to some embodiments

FIG. 4 illustrates an architecture of a system 400 of a network according to some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device.

The UEs 401 and 402 may be configured to connect, e.g., communicatively couple, with a radio access network (RAN) 410. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

According to some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The RAN 410 is shown to be communicatively coupled to a core network (CN) 420 via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

The CN 420 includes network elements. The term "network element" may describe a physical or virtualized equipment used to provide wired or wireless communication network services. In this embodiment, the CN 420 comprises, as network elements, the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN).

Figure 5:
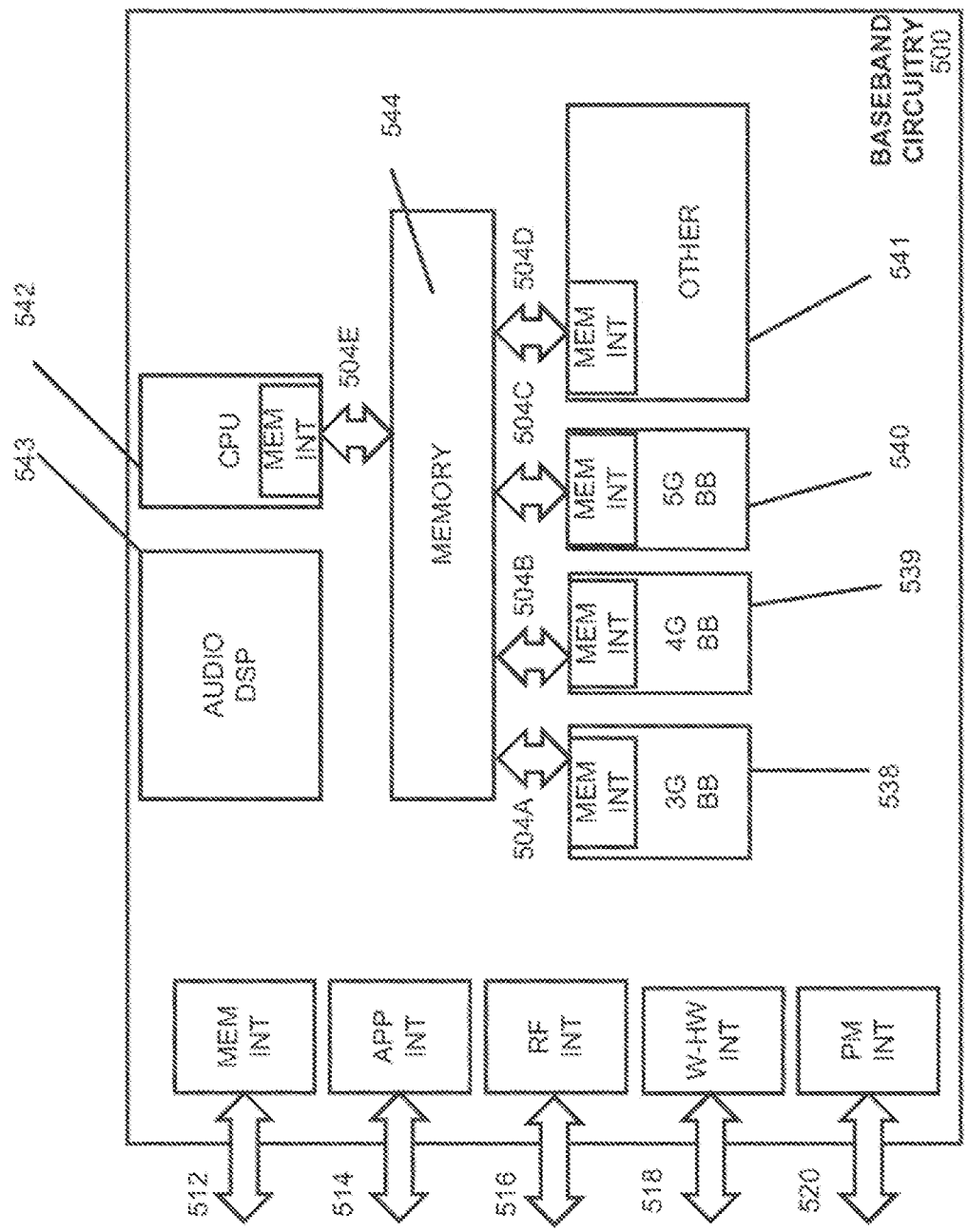
FIG. 5 illustrates example interfaces of baseband circuitry according to various embodiments.

FIG. 5 illustrates example interfaces of baseband circuitry according to various embodiments. The baseband circuitry 500 may comprise processors 538-542 and a memory 544 utilized by said processors. Each of the processors 538-532 may include a memory interface, 504A-504E, respectively, to send/receive data to/from the memory 544. Baseband circuitry 500 may also include an audio digital signal processor (Audio DSP) 543.

The baseband circuitry 500 may further include one or more interfaces to communicatively couple to other circuitries/devices, such as a memory interface 512 (e.g., an interface to send/receive data to/from memory external to the baseband circuitry 500), an application circuitry interface 514 (e.g., an interface to send/receive data to/from an application circuitry), an RF circuitry interface 516 (e.g., an interface to send/receive data to/from an RF circuitry), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from a power management integrated circuit (PMIC).

Figure 6:
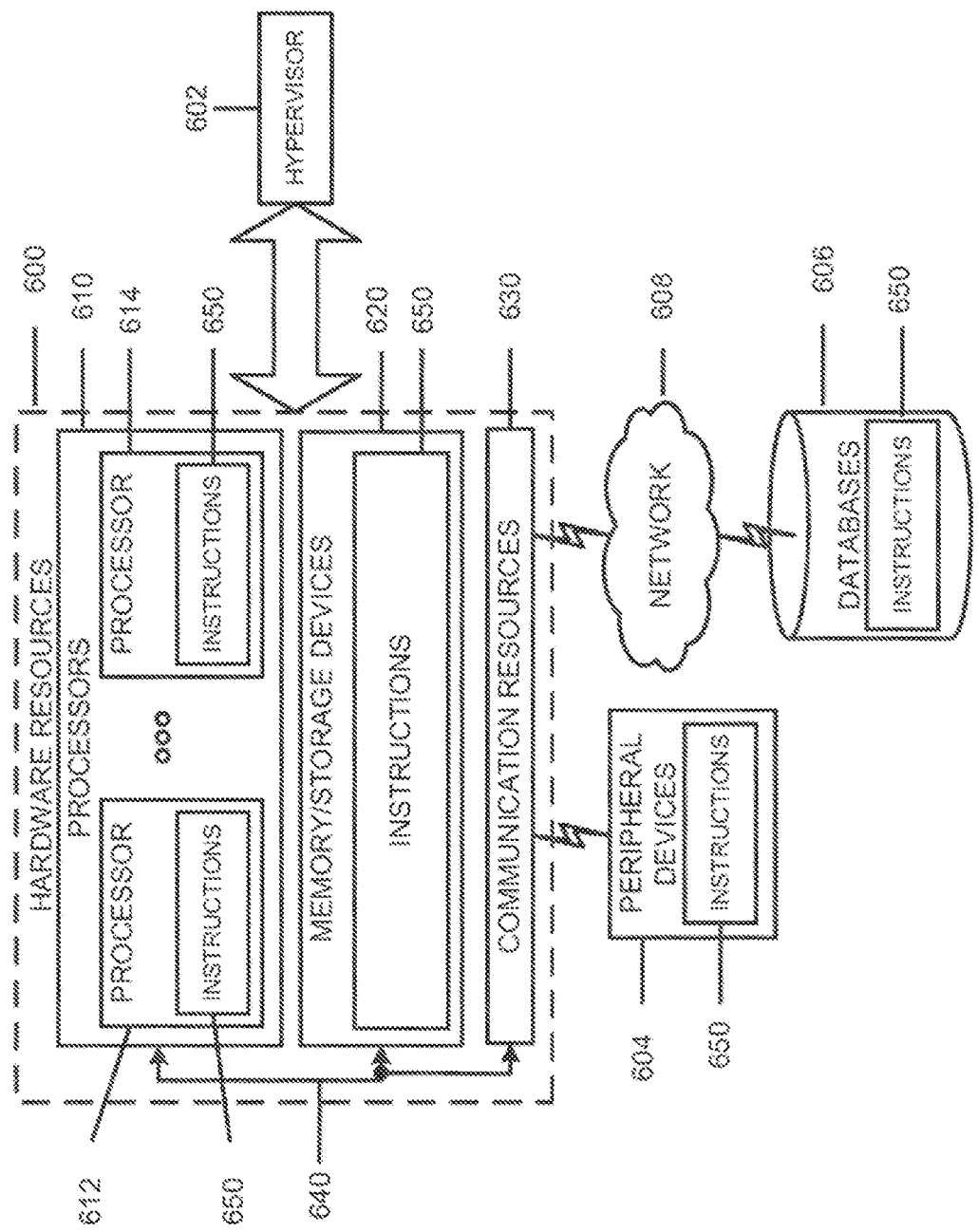
FIG. 6 is a block diagram illustrating components, according to some example embodiments, able to read instructions from a machine-readable or computer-readable medium.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

In some embodiments, the electronic device(s), network(s), system(s), chip(s) or component(s), or portions or implementations thereof, of FIGS. 4-6, or some other figure herein, may be configured to perform one or more processes, techniques, or methods as described herein, or portions thereof. Embodiments of such processes are depicted in FIGS. 1-3. For example, a process according to an embodiments may include indicating, or causing to be indicated, capability to the network about its Rx beam sweeping delay requirement.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

In the present disclosure, "SMTC" refers to an SSB-based measurement timing configuration configured by SSB-MeasurementTimingConfiguration; "SSB" refers to an SS/PBCH block; "field" may refer to individual contents of an information element; "information element" refers to a structural element containing a single or multiple fields; a "Primary Cell" refers to the MCG cell, operating on the primary frequency, in which the UE either performs the initial connection establishment procedure or initiates the connection re-establishment procedure; a "Primary SCG Cell" refers to the SCG cell in which the UE performs random access when performing the Reconfiguration with Sync procedure for DC operation; a "Secondary Cell" refers to a cell providing additional radio resources on top of a Special Cell for a UE configured with CA; a "Secondary Cell Group" refers to the subset of serving cells comprising the PSCell and zero or more secondary cells for a UE configured with DC; a "Serving Cell" refers to the primary cell for a UE in RRC_CONNECTED not configured with CA/DC there is only one serving cell comprising of the primary cell; "serving cell" or "serving cells" refers to the set of cells comprising the Special Cell(s) and all secondary cells for a UE in RRC_CONNECTED configured with CA/DC; a "Special Cell" refers to the PCell of the MCG or the PSCell of the SCG for DC operation; otherwise, the term "Special Cell" refers to the PCell.

Examples of some embodiments are provided below:

Example 1 includes a device of a New Radio (NR) User Equipment (UE), the device including a Radio Frequency (RF) interface, and processing circuitry coupled to the RF interface, the processing circuitry to: generate a signal including capability information of the UE, wherein a time period for intra-frequency cell detection and measurement for the UE is based on the capability information; and cause a transmission of the signal within a cellular network to include the UE using the RF interface.

Example 2 includes the subject matter of Example 1, and optionally, wherein the time period includes at least one of $T_{PSS/SSS\_sync}$, $T_{SSB\_measurement\_period}$, and $T_{SSB\_time\_index}$.

Example 3 includes the subject matter of Example 1, and optionally, wherein the capability information includes at least one of: information regarding a capability of the UE for receive (Rx) beamforming; information regarding an identification time period for intra-frequency cell identification by the UE; information on a number of beams required for Secondary Synchronization Block (SSB)-based measurements; mobility type information on a UE mobility type for the UE; information on power requirements of the UE; or receive (Rx) beam sweeping information for the UE.

Example 4 includes the subject matter of Example 3, and optionally, wherein the capability information includes information on whether the identification time period for intra-frequency cell identification by the UE is long, medium or short.

Example 5 includes the subject matter of Example 3, and optionally, wherein the mobility type information includes information on whether the UE mobility type is stationary, low mobility or high mobility.

Example 6 includes the subject matter of Example 3, and optionally, wherein the Rx beam sweeping information includes information on at least one of a number of beams the UE is to use for receive (Rx) beam sweeping for cell identification; or whether a delay for Rx beam sweeping for the UE corresponds to a long delay or a short delay.

Example 7 includes the subject matter of Example 6, and optionally, wherein the number of beams the UE is to use for Rx beam sweeping corresponds to a maximum number of Rx beams the UE is to use for channel state information reference signal (CSI-RS) (maxNumberRxBeam).

Example 8 includes the device of any one of Examples 1-7, wherein: the UE is to operate in a 24.25 GHz to 52.6 GHz frequency range (a FR2 frequency range); and the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC_period).

Example 9 includes the subject matter of Example 8, and optionally, wherein the scale factor corresponds to $N_{short}$ when a delay for Rx beam sweeping is short, and to $N_{long}$ when a delay for Rx beam sweeping is long.

Example 10 includes the subject matter of any one of Examples 1-7, further including a front-end module coupled to the processing circuitry.

Example 11 includes the subject matter of Example 10, and optionally, further including at least one antenna coupled to the front-end module.

Example 12 includes a method to be used at a New Radio (NR) User Equipment (UE), the method including: generating a signal including capability information of the UE, wherein a time period for intra-frequency cell detection and measurement for the UE is based on the capability information; and causing a transmission of the signal within a cellular network to include the UE using a radio frequency (RF) interface of the UE.

Example 13 includes the subject matter of Example 12, and optionally, wherein the time period includes at least one of $T_{PSS/TSS\_sync}$, $T_{SSB\_measurement\_period}$, and $T_{SSB\_time\_index}$.

Example 14 includes the subject matter of Example 12, and optionally, wherein the capability information includes at least one of: information regarding a capability of the UE for receive (Rx) beamforming; information regarding an identification time period for intra-frequency cell identification by the UE; information on a number of beams required for Secondary Synchronization Block (SSB)-based measurements; mobility type information on a UE mobility type for the UE; information on power requirements of the UE; or receive (Rx) beam sweeping information for the UE.

Example 15 includes the subject matter of Example 14, and optionally, wherein: the capability information includes information on at least one of: whether the identification time period for intra-frequency cell identification by the UE is long, medium or short; or whether the UE mobility type is stationary, low mobility or high mobility; and the Rx beam sweeping information includes information on at least one of: a number of beams the UE is to use for receive (Rx) beam sweeping for cell identification; or whether a delay for Rx beam sweeping for the UE corresponds to a long delay or a short delay.

Example 16 includes the subject matter of Example 15, and optionally, wherein the number of beams the UE is to use for Rx beam sweeping corresponds to a maximum number of Rx beams the UE is to use for channel state information reference signal (CSI-RS) (maxNumberRxBeam).

Example 17 includes the subject matter of Example 12, and optionally, wherein: the UE is to operate in a 24.25 GHz to 52.6 GHz frequency range (a FR2 frequency range); and the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC_period).

Example 18 includes the subject matter of Example 17, and optionally, wherein the scale factor corresponds to $N_{short}$ when a delay for Rx beam sweeping is short, and to $N_{long}$ when a delay for Rx beam sweeping is long.

Example 19 includes a device of a New Radio (NR) User Equipment (UE), the device including: means for generating a signal including capability information of the UE, wherein a time period for intra-frequency cell detection and measurement for the UE is based on the capability information; and means for causing a transmission of the signal within a cellular network to include the UE using a radio frequency (RF) interface of the UE.

Example 20 includes the subject matter of Example 19, and optionally, wherein the time period includes at least one of $T_{PSS/TSS\_sync}$, $T_{SSB\_measurement\_period}$, and $T_{SSB\_time\_index}$.

Example 21 includes the subject matter of Example 19, and optionally, wherein the capability information includes at least one of: information regarding a capability of the UE for receive (Rx) beamforming; information regarding an identification time period for intra-frequency cell identification by the UE; information on a number of beams required for Secondary Synchronization Block (SSB)-based measurements; mobility type information on a UE mobility type for the UE; information on power requirements of the UE; or receive (Rx) beam sweeping information for the UE.

Example 22 includes the subject matter of Example 21, and optionally, wherein: the capability information includes information on at least one of: whether the identification time period for intra-frequency cell identification by the UE is long, medium or short; or whether the UE mobility type is stationary, low mobility or high mobility; and the Rx beam sweeping information includes information on at least one of: a number of beams the UE is to use for receive (Rx) beam sweeping for cell identification; or whether a delay for Rx beam sweeping for the UE corresponds to a long delay or a short delay.

Example 23 includes the subject matter of Example 22, and optionally, wherein the number of beams the UE is to use for Rx beam sweeping corresponds to a maximum number of Rx beams the UE is to use for channel state information reference signal (CSI-RS) (maxNumberRxBeam).

Example 24 includes the device of any one of Examples 19-23, wherein: the UE is to operate in a 24.25 GHz to 52.6 GHz frequency range (a FR2 frequency range); and the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC_period).

Example 25 includes machine-readable medium including code which, when executed, is to cause a machine to perform the method of any one of Examples 12-18.

Example 26 includes a device of a New Radio (NR) evolved Node B (gNodeB), the device including a radio frequency (RF) interface, and one or more processors coupled to the RF interface and configured to receive, through the interface, a signal including capability information of a UE of the NR network; and determine a time period for intra-frequency cell detection and measurement for the UE based on the capability information.

Example 27 includes the subject matter of Example 26, and optionally, wherein the time period includes at least one of $T_{PSS/TSS\_sync}$, $T_{SSB\_measurement\_period}$, and $T_{SSB\_time\_index}$.

Example 28 includes the subject matter of Example 26, and optionally, wherein the capability information includes at least one of: information regarding a capability of the UE for receive (Rx) beamforming; information regarding an identification time period for intra-frequency cell identification by the UE; information on a number of beams required for Secondary Synchronization Block (SSB)-based measurements; mobility type information on a UE mobility type for the UE; information on power requirements of the UE; or receive (Rx) beam sweeping information for the UE.

Example 29 includes the subject matter of Example 28, and optionally, wherein the capability information includes information on whether the identification time period for intra-frequency cell identification by the UE is long, medium or short.

Example 30 includes the subject matter of Example 28, and optionally, wherein the mobility type information includes information on whether the UE mobility type is stationary, low mobility or high mobility.

Example 31 includes the subject matter of Example 28, and optionally, wherein the Rx beam sweeping information includes information on at least one of a number of beams the UE is to use for receive (Rx) beam sweeping for cell identification; or whether a delay for Rx beam sweeping for the UE corresponds to a long delay or a short delay.

Example 32 includes the subject matter of Example 31, and optionally, wherein the number of beams the UE is to use for Rx beam sweeping corresponds to a maximum number of Rx beams the UE is to use for channel state information reference signal (CSI-RS) (maxNumberRx-Beam).

Example 33 includes a device of any one of Examples 26-32, wherein: the UE is to operate in a 24.25 GHz to 52.6 GHz frequency range (a FR2 frequency range); and the time period corresponds to a maximum value as between a lower_bound value, and an upper value based on a scale factor (N) for receive (Rx) beam sweeping times a value based on a number of samples times a time period for a Secondary Signal/Physical Broadcast Channel Block measurement time configuration (SMTC_period).

Example 34 includes the subject matter of Example 33, and optionally, wherein the scale factor corresponds to $N_{short}$ when a delay for Rx beam sweeping is short, and to $N_{long}$ when a delay for Rx beam sweeping is long.

Example 35 includes the subject matter of Example 33, and optionally, wherein the gNodeB is configured to set a periodicity for the SMTC_period based on the mobility type.

Example 36 includes the subject matter of Example 26, and optionally, wherein the network elements including a mobility management entities (MMES), a serving gateway (S-GW), a Packet Data Network (PDN) Gateway (P-GW), and a home subscriber server (HSS) 424.

Example 37 includes a method to be performed at a New Radio (NR) evolved Node B (gNodeB), the method including: processing a signal including capability information of a UE of the NR network; and determining a time period for intra-frequency cell detection and measurement for the UE based on the capability information.

Example 38 includes the subject matter of Example 37, and optionally, wherein the time period includes at least one of $T_{PSS/TSS\_sync}$, $T_{SSB\_measurement\_period}$, and $T_{SSB\_time\_index}$.

Example 39 includes the subject matter of Example 37, and optionally, wherein the capability information includes at least one of: information regarding a capability of the UE for receive (Rx) beamforming; information regarding an identification time period for intra-frequency cell identification by the UE; information on a number of beams required for Secondary Synchronization Block (SSB)-based measurements; mobility type information on a UE mobility type for the UE; information on power requirements of the UE; or receive (Rx) beam sweeping information for the UE.

Example 40 includes the subject matter of Example 39, and optionally, wherein the capability information includes information on whether the identification time period for intra-frequency cell identification by the UE is long, medium or short.

Example 41 includes the subject matter of Example 39, and optionally, wherein the mobility type information includes information on whether the UE mobility type is stationary, low mobility or high mobility.

Example 42 includes the subject matter of Example 39, and optionally, wherein the Rx beam sweeping information includes information on at least one of a number of beams the UE is to use for receive (Rx) beam sweeping for cell identification; or whether a delay for Rx beam sweeping for the UE corresponds to a long delay or a short delay.

Example 43 includes the subject matter of Example 42, and optionally, wherein the number of beams the UE is to use for Rx beam sweeping corresponds to a maximum number of Rx beams the UE is to use for channel state information reference signal (CSI-RS) (maxNumberRx-Beam).

Example 44 includes the method of any one of Examples 37-43, wherein: the UE is to operate in a 24.25 GHz to 52.6 GHz frequency range (a FR2 frequency range); and the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC_period).

Example 45 includes the subject matter of Example 44, and optionally, wherein the scale factor corresponds to $N_{short}$ when a delay for Rx beam sweeping is short, and to $N_{long}$ when a delay for Rx beam sweeping is long.

Example 46 includes the subject matter of Example 44, and optionally, wherein the gNodeB is configured to set a periodicity for the SMTC_period based on the mobility type.

Example 47 includes the subject matter of Example 37, and optionally, wherein the network elements including a mobility management entities (MMES), a serving gateway (S-GW), a Packet Data Network (PDN) Gateway (P-GW), and a home subscriber server (HSS) 424.

Example 48 includes a machine-readable medium including code which, when executed, is to cause a machine to perform the method of any one of Examples 37-47.

Example 49 may include one or more non-transitory computer-readable media comprising instructions to cause an electronic device, upon execution of the instructions by one or more processors of the electronic device, to perform one or more elements of a method described in or related to any of Examples 12-18 or 37-47, or any other method or process described herein.

Example 50 may include an device comprising logic, modules, or circuitry to perform one or more elements of a method described in or related to any of the examples above or any other method or process described herein.

Example 51 may include a signal as described in or related to any of the Examples above, or portions or parts thereof.

Example 52 may include a signal in a wireless network as shown and described herein.

What is claimed is:

1. A apparatus of a User Equipment (UE), the apparatus including a Radio Frequency (RF) interface, and processing circuitry coupled to the RF interface, the processing circuitry to:
    generate a signal including capability information of the UE, wherein a time period for intra-frequency cell detection and measurement for the UE is based on the capability information; and
    cause a transmission of the signal within a cellular network to include the UE using the RF interface;
    wherein the UE is to operate in a 24.25 GHz to 52.6 GHz frequency range (a FR2 frequency range); and
    wherein the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC period).

2. The UE of claim 1, wherein the time period includes at least one of $T_{PSS/SSS\_sync}$, $T_{SSB\_measurement\_period}$, and $T_{SSB\_time\_index}$.

3. The UE of claim 1, wherein the capability information includes at least one of: information regarding a capability of the UE for receive (Rx) beamforming;
    information regarding an identification time period for intra-frequency cell identification by the UE;

information on a number of beams required for Secondary Synchronization Block (SSB)-based measurements;
mobility type information on a UE mobility type for the UE;
information on power requirements of the UE; or
receive (Rx) beam sweeping information for the UE.

4. The UE of claim 3, wherein the capability information includes information on whether the identification time period for intra-frequency cell identification by the UE is long, medium or short.

5. The UE of claim 3, wherein the Rx beam sweeping information includes information on at least one of a number of beams the UE is to use for receive (Rx) beam sweeping for cell identification; or whether a delay for Rx beam sweeping for the UE corresponds to a long delay or a short delay.

6. The UE of claim 5, wherein the number of beams the UE is to use for Rx beam sweeping corresponds to a maximum number of Rx beams the UE is to use for channel state information reference signal (CSI-RS) (maxNumberRxBeam).

7. The UE of claim 1, wherein the scale factor corresponds to $N_{short}$ when a delay for Rx beam sweeping is short, and to $N_{long}$ when the delay for Rx beam sweeping is long.

8. A method to be used at a User Equipment (UE), the method including:
generating a signal including capability information of the UE, wherein a time period for intra-frequency cell detection and measurement for the UE is based on the capability information; and
causing a transmission of the signal within a cellular network to include the UE using a radio frequency (RF) interface of the UE;
wherein the UE is to operate in a 24.25 GHz to 52.6 GHz frequency range (a FR2 frequency range); and
wherein the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC period).

9. The method of claim 8, wherein the time period includes at least one of $T_{PSS/SSS\_sync}$, $T_{SSB\_measurement\_period}$, and $T_{SSB\_time\_index}$.

10. The method of claim 8, wherein the capability information includes at least one of: information regarding a capability of the UE for receive (Rx) beamforming;
information regarding an identification time period for intra-frequency cell identification by the UE;
information on a number of beams required for Secondary Synchronization Block (SSB)-based measurements;
mobility type information on a UE mobility type for the UE;
information on power requirements of the UE; or
receive (Rx) beam sweeping information for the UE.

11. The method of claim 10, wherein:
the capability information includes information on at least one of:
whether the identification time period for intra-frequency cell identification by the UE is long, medium or short; or
whether the UE mobility type is stationary, low mobility or high mobility; and
the Rx beam sweeping information includes information on at least one of:
a number of beams the UE is to use for receive (Rx) beam sweeping for cell identification; or
whether a delay for Rx beam sweeping for the UE corresponds to a long delay or a short delay.

12. The method of claim 11, wherein the number of beams the UE is to use for Rx beam sweeping corresponds to a maximum number of Rx beams the UE is to use for channel state information reference signal (CSI-RS) (maxNumberRxBeam).

13. The method of claim 8, wherein the scale factor corresponds to $N_{short}$ when a delay for Rx beam sweeping is short, and to $N_{long}$ when a delay for Rx beam sweeping is long.

14. A User Equipment (UE), the UE including:
means for generating a signal including capability information of the UE, wherein a time period for intra-frequency cell detection and measurement for the UE is based on the capability information; and
means for causing a transmission of the signal within a cellular network to include the UE using a radio frequency (RF) interface of the UE;
wherein the UE is to operate in a 24.25 GHz to 52.6 GHz frequency range (a FR2 frequency range); and
wherein the time period corresponds to a maximum value as between a lower bound value, and an upper value based on a scale factor (N) for receive (Rx) beam sweeping times a value based on a number of samples times a time period for a Secondary Signal/Physical Broadcast Channel Block measurement time configuration (SMTC period).

15. The UE of claim 14, wherein the time period includes at least one of $T_{PSS/SSS\_sync}$, $T_{SSB\_measurement\_period}$, and $T_{SSB\_time\_index}$.

16. The UE of claim 14, wherein the capability information includes at least one of:
information regarding a capability of the UE for receive (Rx) beam forming;
information regarding an identification time period for intra-frequency cell identification by the UE;
information on a number of beams required for Secondary Synchronization Block (SSB)-based measurements;
mobility type information on a UE mobility type for the UE;
information on power requirements of the UE; or
receive (Rx) beam sweeping information for the UE.

17. The UE of claim 16, wherein:
the capability information includes information on at least one of:
whether the identification time period for intra-frequency cell identification by the UE is long, medium or short; or
whether the UE mobility type is stationary, low mobility or high mobility; and
the Rx beam sweeping information includes information on at least one of:
a number of beams the UE is to use for receive (Rx) beam sweeping for cell identification; or
whether a delay for Rx beam sweeping for the UE corresponds to a long delay or a short delay.

18. The UE of claim 17, wherein the number of beams the UE is to use for Rx beam sweeping corresponds to a maximum number of Rx beams the UE is to use for channel state information reference signal (CSI-RS) (maxNumberRxBeam).

* * * * *